US010469755B2

(12) United States Patent
Badr et al.

(10) Patent No.: US 10,469,755 B2
(45) Date of Patent: Nov. 5, 2019

(54) STORING METADATA RELATED TO CAPTURED IMAGES

(71) Applicant: Google Inc., Mountain View, CA (US)

(72) Inventors: Ibrahim Badr, Zurich (CH); Gökhan Bakir, Zurich (CH); Daniel Kunkle, Boston, MA (US); Kavin Karthik Ilangovan, Zurich (CH); Denis Burakov, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 144 days.

(21) Appl. No.: 15/602,661

(22) Filed: May 23, 2017

(65) Prior Publication Data

US 2018/0338109 A1 Nov. 22, 2018

Related U.S. Application Data

(60) Provisional application No. 62/507,108, filed on May 16, 2017.

(51) Int. Cl.
*H04N 5/232* (2006.01)
*G06K 9/00* (2006.01)
(Continued)

(52) U.S. Cl.
CPC ..... *H04N 5/23293* (2013.01); *G06F 16/5846* (2019.01); *G06F 16/5866* (2019.01);
(Continued)

(58) Field of Classification Search
CPC ........ G06F 17/30268; G06F 17/30401; H04N 5/23293–5/232945
See application file for complete search history.

(56) References Cited

U.S. PATENT DOCUMENTS

| 2012/0310968 | A1 | 12/2012 | Solem et al. |
| 2013/0346068 | A1* | 12/2013 | Solem ............... G06F 17/30268 704/9 |

(Continued)

OTHER PUBLICATIONS

International Search Report and Written Opinion of PCT Ser. No. PCT/US2018/032787; 13 pages, dated Jul. 26, 2018.

(Continued)

*Primary Examiner* — Paul M Berardesca
(74) *Attorney, Agent, or Firm* — Middleton Reutlinger

(57) ABSTRACT

The present disclosure relates to user-selected metadata related to images captured by a camera of a client device. User-selected metadata may include contextual information and/or information provided by a user when the images are captured. In various implementations, a free form input may be received at a first client device of one or more client devices operated by a user. A task request may be recognized from the free form input, and it may be determined that the task request includes a request to store metadata related to one or more images captured by a camera of the first client device. The metadata may be selected based on content of the task request. The metadata may then be stored, e.g., in association with one or more images captured by the camera, in computer-readable media. The computer-readable media may be searchable by the metadata.

19 Claims, 8 Drawing Sheets

(51) Int. Cl.
  *G06K 9/32* (2006.01)
  *G06F 16/58* (2019.01)
  *G06F 16/583* (2019.01)
  *H04N 1/00* (2006.01)
  *G06K 9/46* (2006.01)
  *G06K 9/62* (2006.01)
  *H04N 5/77* (2006.01)
  *H04N 9/82* (2006.01)

(52) U.S. Cl.
  CPC ......... *G06K 9/00671* (2013.01); *G06K 9/325* (2013.01); *H04N 1/00* (2013.01); *H04N 5/23222* (2013.01); *H04N 5/232933* (2018.08); *H04N 5/232935* (2018.08); *H04N 5/772* (2013.01); *H04N 9/8205* (2013.01); *G06K 9/4628* (2013.01); *G06K 9/6273* (2013.01); *G06K 2209/01* (2013.01)

(56) References Cited

U.S. PATENT DOCUMENTS

| | | | |
|---|---|---|---|
| 2014/0226053 A1* | 8/2014 | Winer | H04N 5/23293 348/333.05 |
| 2014/0344688 A1 | 11/2014 | Kulick et al. | |
| 2016/0210704 A1* | 7/2016 | Fang | G06Q 50/01 |
| 2017/0187852 A1* | 6/2017 | Baek | H04M 1/0264 |

OTHER PUBLICATIONS

European Patent Office; Examination Report issued in Application No. 18733010.5 dated Sep. 20, 2019.

\* cited by examiner

STORING METADATA RELATED TO CAPTURED IMAGES

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). For example, humans (which when they interact with automated assistants may be referred to as "users") may provide commands, queries, and/or requests using spoken natural language input (i.e. utterances) which may in some cases be converted into text and then processed, and/or by providing textual (e.g., typed) natural language input. Some automated assistants may be able to "remember" simple facts when requested to do so by a user. For example, a user may request that an automated assistant remember the user's name, the user's spouse's name, the user's anniversary, etc. The user may later request the automated assistant to recall these facts. However, these simple facts tend to be stored in isolation, without much in the way of contextual information.

SUMMARY

Techniques are described herein for storing user-selected metadata related to image(s) captured by a camera of a client device. User-selected metadata may include, for instance, contextual information (beyond metadata already stored in association with images, such as geotags, etc.) and/or information provided by a user when the images are captured. In some implementations, a user may provide input that includes a "task request" for an automated assistant—which executes at least in part on the user's camera-equipped client device—to store user-selected metadata related to one or more images captured by the camera. In some implementations, the metadata may include content of the user's task request. In other implementations, the metadata may include data that is selected based on content of the task request (e.g., a position coordinate). In some implementations, the user may later provide another task request, such as a search query, to an automated assistant, and the automated assistant may attempt to match the task request to user-selected metadata that is responsive to the search query. The subsequent task request may then be responded to based on the metadata.

As a simple example, a user may, when taking a picture of the user's passport, provide the spoken task request, "remember that this is my passport." The metadata related to the image may then be stored, e.g., in association the image itself. Later, the user may ask the automated assistant, "show me my passport" or "show me information about my passport, and the metadata and/or previously-captured image may be surfaced to the user. In some implementations, optical character recognition ("OCR") may be performed on the captured image of the passport and stored as metadata as well. Thus, in addition to in some instances being able to recall the passport image via a request to an automated assistant, in some implementations, the user may be able to ask the automated assistant to retrieve information about the passport, such as its expiration date. A user may use a similar technique to store an image of Wi-Fi credentials (e.g., service set identifier, or "SSID," and password printed on the bottom of the Wi-Fi router), and later ask for the OCR'd credentials.

As another example, a user may request that the automated assistant "remember where I parked" while the user points the camera at a location. In some such implementations, the automated assistant may remember the location, e.g., based on geotag(s) associated with an image the user captures and/or based on the user's current position coordinates (determined, for instance, from a GPS sensor). When the user later asks, "where did I park?", in some implementations, the captured image may be presented, and in some cases the automated assistant may audibly or visually present at least some of the corresponding metadata, such as the position coordinate.

A variety of other user-selected metadata may be stored, and in various implementations may be used for various purposes in addition to or instead of simple image recall. In some implementations, a user may request that an object depicted in an image be identified as an entity, such as the user's spouse. In some such implementations, that image may be used as a reference image associated with the user-indicated entity. In some implementations, image processing may be performed on that image and/or on other stored images of the user's in order to identify the same entity in different images. Thus, for example, once a user points the camera at the user's wife and says "this is my wife," that image may be used to label other images of the user's wife that were captured previously and/or that will be captured in the future.

As another example, a user passing a restaurant could capture an image of the restaurant and instruct an automated assistant to "remind me to check this restaurant out later." Image processing (e.g., OCR) may be performed on the captured image to identify, for instance, any discernable words, such as the name of the restaurant, the address, etc. Additionally or alternatively, the restaurant may be identified from other signals, such as the user's position coordinate when the image was captured (or the geotag that may already be stored in the image's metadata). The user later can recall this image and/or the metadata by requesting an automated assistant to "remind me of that restaurant I told you about." Additionally or alternatively, the automated assistant may automatically surface (e.g., audibly or visibly output) a reminder to the user at some point in the future, such as when the user is near the restaurant again (e.g., based on the user's GPS coordinates) or when the user asks for restaurant recommendations.

In some implementations, a user may capture an image of an entity such as a product, and may ask an automated assistant to store, as metadata related to the image, one or more user-selected pieces of information. For example, while capturing an image of a bottle of wine, the user could request that an automated assistant remember that "This wine is excellent." When the user later asks for a wine recommendation, the automated assistant may recommend that bottle, along with any other bottles the user may have saved. Additionally or alternatively, suppose the user is later viewing a plurality of wines on a shelf at a store through an augmented reality display that may be included, for instance, in so-called "smart" glasses. Based on the previously-stored image and corresponding metadata, the same wine may be recognized on the shelf and may be visually annotated to the user, e.g., by highlighting or otherwise visually emphasizing the wine on the shelf (e.g., "you said this wine was 'excellent'"). Similarly, a user with a camera-equipped smart phone could point the camera at the same shelf of wines, and the wine the user liked may be visually emphasized in the smart phone's electronic viewfinder. Similar techniques may be applied to human entities identified by a user in images, e.g., to help the user remember the names of (or other information related to) other people at a later time.

A user may invoke an automated assistant to store user-selected metadata related to a captured image in various ways. In some implementations, a graphical user interface ("GUI") associated with a camera application may include a graphical element that is selectable by the user to invoke the automated assistant. Immediately before, during, or after the image is taken, the user may select this graphical element and provide a task request that can be used to store user-selected metadata. In other implementations, the user may simply invoke the automated assistant using a preexisting invocation phrase (e.g., "Hey, Automated Assistant," or by saying "remember") immediately before, during, or after taking a picture.

In some implementations, the automated assistant may recommend a task request to the user in response to various signals. For example, a user could point a camera at a car (e.g., the user's car). The automated assistant may recognize the specific car (or more generally, a vehicle) in the image and may ask the user if the user would like the automated assistant to remember a parking place.

In some implementations, a method performed by one or more processors is provided that includes: receiving, at a first client device of one or more client devices operated by a user, a free form input from the user; recognizing a task request from the free form input; determining that the task request comprises a request to store metadata related to one or more images captured by a camera of the first client device, wherein the metadata is selected based on content of the task request; and storing, in one or more computer-readable mediums the metadata, wherein the one or more computer-readable mediums are searchable using the metadata.

These and other implementations of technology disclosed herein may optionally include one or more of the following features.

In various implementations, the method may further include receiving, at the first client device or a second client device of the one or more client devices, a second free form input; recognizing another task request from the second free form input; determining that the metadata related to the one or more images captured by the camera is responsive to the another task request; and in response to determining that the metadata is responsive to the another task request, performing the task request.

In various implementations, the free form input may be received while an electronic viewfinder of the first client device streams data captured by a camera of the first client device. In various implementations, the method may further include providing, as output via one or more output devices of the first client device, the task request as a suggestion to the user, wherein the task request is selected based on one or more signals generated by one or more sensors of the first client device. In various implementations, the one or more signals may include data captured by the camera. In various implementations, the one or more signals may include position coordinate data from a position coordinate sensor.

In various implementations, the method may further include: performing image processing on the one or more images; based on the image processing, identifying an object depicted in the one or more images; and storing the metadata in association with another stored image that depicts the same object or another object sharing one or more attributes with the object.

In various implementations, the method may further include performing optical character recognition on a portion of the one or more images to determine textual content depicted in the one or more images. In various implementations, the metadata may further include at least some of the textual content. In various implementations, the metadata may include at least some of the content of the task request. In various implementations, the metadata may include a position coordinate obtained simultaneously with capture of the one or more images.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
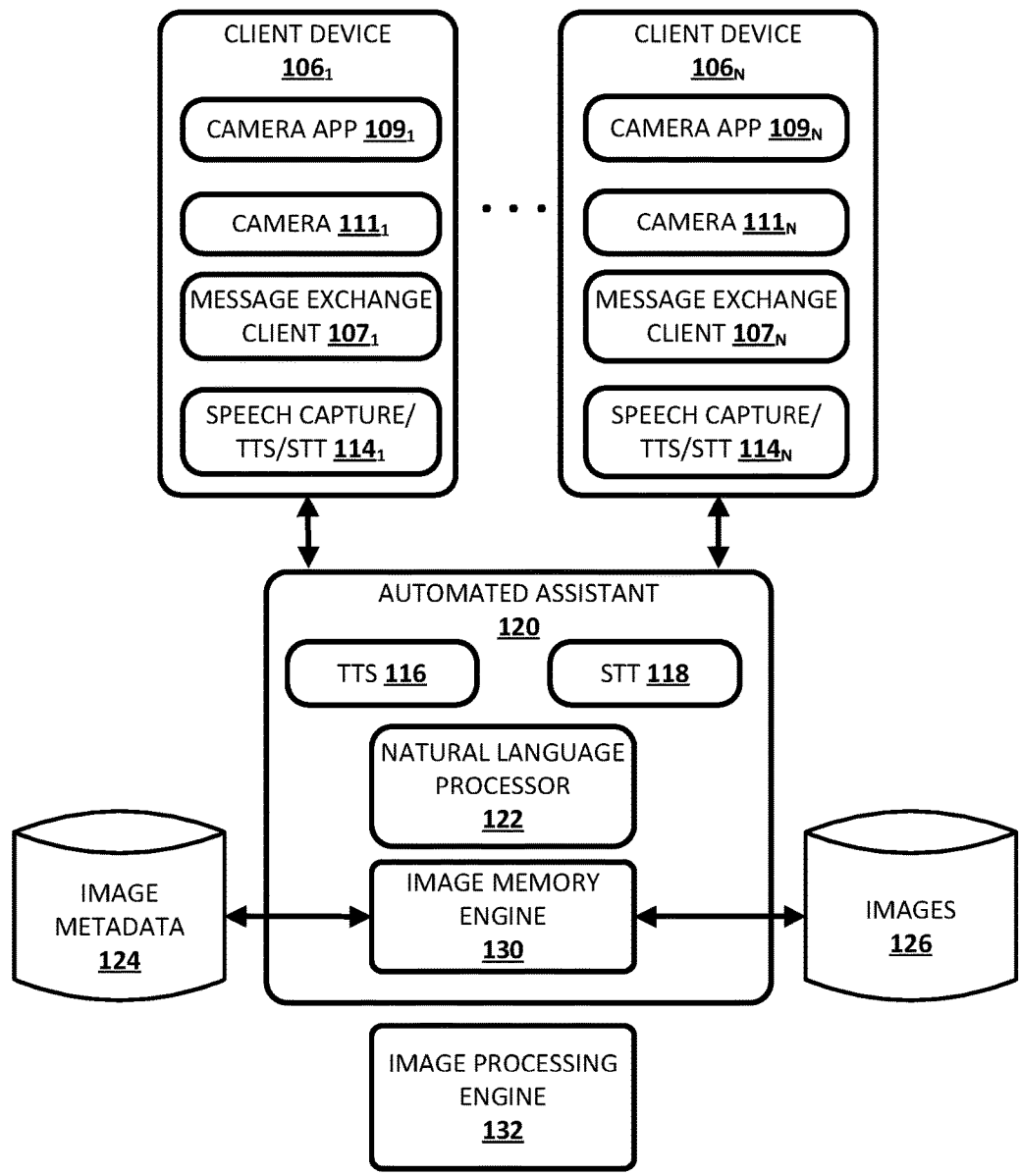
FIG. 1 is a block diagram of an example environment in which techniques disclosed herein may be implemented.

Now turning to FIG. 1, an example environment in which techniques disclosed herein may be implemented is illustrated. The example environment includes a plurality of client computing devices $106_{1-N}$ and an automated assistant 120. Although automated assistant 120 is illustrated in FIG. 1 as separate from the client computing devices $106_{1-N}$, in some implementations all or aspects of automated assistant 120 may be implemented by one or more of the client computing devices $106_{1-N}$. For example, client device $106_1$ may implement one instance of or more aspects of automated assistant 120 and client device $106_N$ may also implement a separate instance of those one or more aspects of automated assistant 120. In implementations where one or more aspects of automated assistant 120 are implemented by one or more computing devices remote from client computing devices $106_{1-N}$, the client computing devices $106_{1-N}$ and those aspects of automated assistant 120 may communicate via one or more networks such as a local area network (LAN) and/or wide area network (WAN) (e.g., the Internet).

The client devices $106_{1-N}$ may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, and/or a wearable apparatus of the user that includes a computing device (e.g., a watch of the user having a computing device, glasses of the user having a computing device, a virtual or augmented reality computing device). Additional and/or alternative client computing devices may be provided. In some implementations, automated assistants configured with selected aspects of the present disclosure may be installed on other types of electronic devices, such as digital cameras. In some implementations, a given user may communicate with automated assistant 120 utilizing a plurality of client computing devices that collectively from a coordinated "ecosystem" of computing devices. In some such implementations, automated assistant 120 may be considered to "serve" that given user, e.g., endowing automated assistant 120 with enhanced access to resources (e.g., content, documents, etc.) for which access is controlled by the "served" user. However, for the sake of brevity, some examples described in this specification will focus on a user operating a single client computing device 106.

Each of the client computing devices $106_{1-N}$ may operate a variety of different applications, such as a corresponding one of a plurality of message exchange clients $107_{1-N}$, a corresponding one of a plurality of camera applications $109_{1-N}$, and a speech capture/text-to-speech ("TTS")/speech-to-text ("STT") module $114_{1-N}$. Each client device 106 may also be equipped with one or more cameras 111 (e.g., a front-facing and/or rear-facing camera in the case of a smart phone or tablet).

Each speech capture/TTS/STT module 114 may be configured to perform one or more functions: capture a user's speech, e.g., via a microphone (not depicted); convert that captured audio to text; and/or convert text to speech. For example, in some implementations, because a client device 106 may be relatively constrained in terms of computing resources (e.g., processor cycles, memory, battery, etc.), the speech capture/TTS/STT module 114 that is local to each client device 106 may be configured to convert a finite number of different spoken phrases—particularly phrases that invoke automated assistant 120—to text. Other speech input may be sent to automated assistant 120, which may include a cloud-based TTS module 116 and/or a cloud-based STT module 118.

STT module 118 may be configured to leverage the virtually limitless resources of the cloud to convert audio data captured by speech capture/TTS/STT module 114 into text (which may then be provided to natural language processor 122). TTS module 116 may be configured to leverage the virtually limitless resources of the cloud to convert textual data (e.g., natural language responses formulated by automated assistant 120) into computer-generated speech output. In some implementations, TTS module 116 may provide the computer-generated speech output to client device 106 to be output directly, e.g., using one or more speakers. In other implementations, textual data (e.g., natural language responses) generated by automated assistant 120 may be provided to speech capture/TTS/STT module 114, which may then convert the textual data into computer-generated speech output locally.

Message exchange clients $107_{1-N}$ may come in various forms and the forms may vary across the client computing devices $106_{1-N}$ and/or multiple forms may be operated on a single one of the client computing devices $106_{1-N}$. In some implementations, one or more of the message exchange clients $107_{1-N}$ may come in the form of a short messaging service ("SMS") and/or multimedia messaging service ("MMS") client, an online chat client (e.g., instant messenger, Internet relay chat, or "IRC," etc.), a messaging application associated with a social network, a personal assistant messaging service dedicated to conversations with automated assistant 120, and so forth. In some implementations, one or more of the message exchange clients $107_{1-N}$ may be implemented via a webpage or other resources rendered by a web browser (not depicted) or other application of client computing device 106.

Camera applications $109_{1-N}$ may enable users to control cameras $111_{1-N}$. For example, one or more of camera applications $109_{1-N}$ may provide graphical user interfaces that users may interact with to capture one or more images and/or videos, e.g., for storing, video conferencing, etc. In some implementations, camera applications $109_{1-N}$ may interact/interface with automated assistant 120 as described herein to enable users to store user-selected metadata, e.g., in association with images captured by cameras $111_{1-N}$. In other implementations, one or more of camera applications $109_{1-N}$ may have its own built-in functionality, distinct from automated assistant 120, that enables users to store user-selected metadata, e.g., in association with images captured by cameras $111_{1-N}$. In various implementations, this stored user-selected metadata may be accessible to automated assistant 120 and/or other components of client devices $106_{1-N}$ to be searched and viewed/consumed by users at a later time. Additionally or alternatively, in some implementations, message exchange client 107 or any other application installed on a client device 106 may include functionality that enables the application to access data captured by camera 111, as well as metadata stored therewith, and perform techniques described herein.

As described in more detail herein, automated assistant 120 engages in human-to-computer dialog sessions with one or more users via user interface input and output devices of one or more client devices $106_{1-N}$. In some implementations, automated assistant 120 may engage in a human-to-computer dialog session with a user in response to user interface input provided by the user via one or more user interface input devices of one of the client devices $106_{1-N}$. In some of those implementations, the user interface input is explicitly directed to automated assistant 120. For example, one of the message exchange clients $107_{1-N}$ may be a personal assistant messaging service dedicated to conversations with automated assistant 120 and user interface input provided via that personal assistant messaging service may be automatically provided to automated assistant 120. Also, for example, the user interface input may be explicitly directed to automated assistant 120 in one or more of the message exchange clients $107_{1-N}$ based on particular user interface input that indicates automated assistant 120 is to be invoked. For instance, the particular user interface input may be one or more typed characters (e.g., @AutomatedAssistant), user interaction with a hardware button and/or virtual button (e.g., a tap, a long tap), an oral command (e.g., "Hey Automated Assistant"), and/or other particular user interface input. In some implementations, automated assistant 120 may engage in a dialog session in response to user interface input, even when that user interface input is not explicitly directed to automated assistant 120. For example, automated assistant 120 may examine the contents of user interface input and engage in a dialog session in response to certain terms being present in the user interface input and/or based on other cues. In many implementations, automated assistant 120 may engage interactive voice response ("IVR"), such that the user can utter commands, searches, etc., and the automated assistant may utilize natural language processing and/or one or more grammars to convert the utterances into text, and respond accordingly.

Each of the client computing devices $106_{1-N}$ and automated assistant 120 may include one or more memories for storage of data and software applications, one or more processors for accessing data and executing applications, and other components that facilitate communication over a network. The operations performed by one or more of the client computing devices $106_{1-N}$ and/or by automated assistant 120 may be distributed across multiple computer systems. Automated assistant 120 may be implemented as, for example, computer programs running on one or more computers in one or more locations that are coupled to each other through a network.

Automated assistant 120 may include, among other components not depicted in FIG. 1, a natural language processor 122 and an image memory engine 130. In some implementations, one or more of the engines and/or modules of automated assistant 120 may be omitted, combined, and/or implemented in a component that is separate from automated assistant 120. In some implementations, automated assistant 120 generates responsive content in response to various inputs generated by a user of one of the client devices $106_{1-N}$ during a human-to-computer dialog session with automated assistant 120. Automated assistant 120 provides the responsive content (e.g., over one or more networks when separate from a client device of a user) for presentation to the user as part of the dialog session. For example, automated assistant 120 may generate responsive content in response to free-form natural language input provided via one of the client devices $106_{1-N}$. As used herein, free-form input is input that is formulated by a user and that is not constrained to a group of options presented for selection by the user.

As used herein, a "dialog session" may include a logically-self-contained exchange of one or more messages between a user and automated assistant 120 (and in some cases, other human participants in the thread). Automated assistant 120 may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated product), locking/sleeping of the client device between sessions, change of client devices used to interface with one or more instances of automated assistant 120, and so forth.

In some implementations, when automated assistant 120 provides a prompt that solicits user feedback, automated assistant 120 may preemptively activate one or more components of the client device (via which the prompt is provided) that are configured to process user interface input to be received in response to the prompt. For example, where the user interface input is to be provided via a microphone of the client device $106_1$, automated assistant 120 may provide one or more commands to cause: the microphone to be preemptively "opened" (thereby preventing the need to hit an interface element or speak a "hot word" to open the microphone), a local speech to text processor of the client device $106_1$ to be preemptively activated, a communications session between the client device $106_1$ and a remote speech to text processor to be preemptively established, and/or a graphical user interface to be rendered on the client device $106_1$ (e.g., an interface that includes one or more selectable elements that may be selected to provide feedback). This may enable the user interface input to be provided and/or processed more quickly than if the components were not preemptively activated.

Natural language processor 122 of automated assistant 120 processes natural language input generated by users via client devices $106_{1-N}$ and may generate annotated output for use by one or more other components of automated assistant 120, such as image memory engine 130. For example, the natural language processor 122 may process natural language free-form input that is generated by a user via one or more user interface input devices of client device $106_1$. The generated annotated output includes one or more annotations of the natural language input and optionally one or more (e.g., all) of the terms of the natural language input.

In some implementations, the natural language processor 122 is configured to identify and annotate various types of grammatical information in natural language input. For example, the natural language processor 122 may include a part of speech tagger configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser (not depicted) configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the natural language processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. For example, a "banana" node may be connected (e.g., as a child) to a "fruit" node," which in turn may be connected (e.g., as a child) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a "business" node, a node representing a city and/or state in which the restaurant is located, and so forth.

The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations.

As mentioned above, automated assistant 120, e.g., by way of image memory engine 130, may enable users to store user-selected metadata that is related to images captured by cameras 111$_{1-N}$, (e.g., in searchable computer-readable media such as one or more databases). In some implementations, user-selected metadata may be stored, e.g., by image memory engine 130, in an image metadata index 124. In some implementations, corresponding images may be stored in an images index 126, although this is not required (e.g., in some implementations the images may be discarded once metadata is extracted). In some such implementations, a given metadata record in metadata index 124 and a corresponding image in images database 126 may be associated in various ways, such as via a unique identifier, filename, etc. However, this is not meant to be limiting. In various implementations, user-selected metadata and the corresponding images may be stored together in a single index, or only the metadata may be stored. Moreover, user-selected metadata and/or corresponding images may be stored locally on client devices 106$_{1-N}$, on one or more computing systems remote from client devices 106$_{1-N}$, or any combination thereof. Generally speaking, while several examples described herein involve storing metadata in association with captured images, this is not required, and metadata may be stored in isolation, and related images may or may not be stored.

User-selected metadata may come in various forms. In some implementations, user-selected metadata may include content contained in a task request provided by a user to automated assistant 120. For example, a user may take a picture of the user's spouse, and may provide the task request (spoken or as typed input) "remember that this is my spouse." The picture may be stored in images index 126, and metadata indicating that the picture depicts the user's spouse may be stored in image metadata index 124.

In some implementations, the user-selected metadata may include information generated in response to a user's request to store metadata. For example, in some implementations, user-selected metadata may include a position coordinate obtained simultaneously with capture of the image(s). Suppose a user takes a picture of particularly appealing area in a park and says, "Remember this location for my next meditation session." Automated assistant 120 may obtain a position coordinate, e.g., generated by a Global Positioning System ("GPS") sensor on the user's client device 106, at the same time (or immediately before or after) as the image of the area is captured. This position coordinate may be stored in image metadata index 124, e.g., in association with the image stored in images index 126. In this particular example, additional metadata that may be searchable by the user later, such as "meditation," meditation session," "next meditation session," etc., may also be stored in image metadata index 124. Additionally or alternatively, in some implementations, the location may be provided to a map application installed on client device 106, e.g., as a saved location, dropped pin, etc. When the user later operates the map application and clicks on that location or dropped pin, the image the user captured may or may not be presented.

In yet other implementations, the user-selected metadata may include information contained in the image itself, such as text that is captured using optical character recognition ("OCR"), objects identified in the image, e.g., by image processing engine 132 described below, based on various object recognition techniques, and/or by reading visual indicia (e.g., bar codes, quick response or "QR" codes, etc.) in the image. Thus, it should be understood that "user-selected metadata" is not limited to information input explicitly and/or deliberately by the user, but also includes information that is generated, observed, captured, and/or recognized as a consequence of the user triggering techniques described herein to store metadata, e.g., in association with images.

Image memory engine 130 may also be configured to subsequently retrieve user-selected data from image metadata index 124 and/or corresponding image(s) from images index 126 in response to free-form input received from a user at client device 106. Continuing with the example above, suppose the same user or a different user later provides a search query, "Where is the location for my next meditation session?" The query may be matched to the metadata related the image of the appealing area of the park. In various implementations, the responsive metadata and/or the corresponding image may then be surfaced, e.g., by being rendered on a display of a client device 106 or audibly rendered using one or more speakers. As an example, the meditating user may be presented with the image he or she captured of the appealing area of the park, along with information that enables the user to find the location (i.e. position coordinate) again. This information may include, for instance, a so-called selectable "deeplink" that the user may select to invoke a maps application installed on client device 106, with the location pre-loaded. In other instances, the information may include a rendered map with the location marked, e.g., with an "X" or a dropped pin.

In some implementations, the aforementioned image processing engine 132, which may or may not be integral with automated assistant 120, may be configured to perform various types of image processing on images in images index 126. In some such implementations, this image processing may be triggered by use of techniques described herein. For example, a user may employ techniques described herein to request that an object in a captured image be identified as an entity, such as the user's spouse. In some such implementations, that image may be used as a reference image associated with the user-indicated entity. In some implementations, image processing may be performed, e.g., by image processing engine 132, on that image and/or on other images stored in images index 126, in order to identify the same entity in different images. Thus, for example, once a user points the camera at the user's wife and says "this is my wife," that image may be used as a reference image for labeling other images of the user's wife that were captured previously and/or that will be captured in the future.

Additionally or alternatively, image processing engine 132 may be configured to perform other types of image processing, such as object recognition, OCR, etc., in order to identify objects and/or text depicted in images related to user-selected metadata. In some implementations, recognized objects' identities (e.g., a particular product, a particular type of food, a particular type of vehicle, a particular bottle of wine, etc.) may be stored as user-selected metadata in image metadata index 124, and may be used in various ways. As will be described below, in some implementations, when a user points a camera of a client device towards similar objects (e.g., objects sharing one or more attributes) in the future, image processing engine 132 may match the objects currently captured in an electronic viewfinder with objects depicted in images stored in association with user-selected metadata. In some such implementations, image memory engine 130 may then visually annotate the current camera view to provide user-selected metadata associated with the object.

For instance, a user could capture an image of a particular nut to which the user is allergic, store that image, e.g., in association with metadata indicating the user's allergy (e.g., "remember that I'm allergic to this type of nut"). Whenever the same kind of nut is depicted subsequently in the electronic viewfinder, that depicted nut may be recognized, e.g., by image processing engine 132, and visually annotated to remind/warn the user of the allergy. Additionally or alternatively, non-visual annotations, such as audible annotations (e.g., spoken by automated assistant 120), alarms, vibrations, etc., may be used. Similar approaches may be used with-so-called "smart glasses" or other technologies that facilitate augmented reality viewing of an environment (e.g., telepresence robots, video conferencing, etc.). For example, whenever the user views the same kind of nut through smart glasses, the smart glasses may recognize the nut, e.g., based on the user's previously captured image of the same type of nut, and visually annotate the nut (e.g., highlight it in red, display metadata as text, etc.) to remind the user in real time of the allergy.

Image processing engine 132 may be configured to process images using various techniques to achieve a variety of goals. For example, to recognize objects (e.g., vehicles, clothing types, products, locations, etc.) depicted in images, image processing engine 132 may employ techniques including feature-based methods such as interpretation trees, pose consistency, and pose clustering, appearance-based methods such as edge matching, divide-and-conquer searching, gradient matching, and/or histograms, computer-aided design ("CAD") model comparisons, methods that employ various types of machine learning models (e.g., convolutional and other types of trained neural networks), feature detection, and so forth. Similarly, image processing engine 132 may employ a variety of techniques to perform OCR, including but not limited to matrix matching, feature extraction, and so forth.

Figure 2:
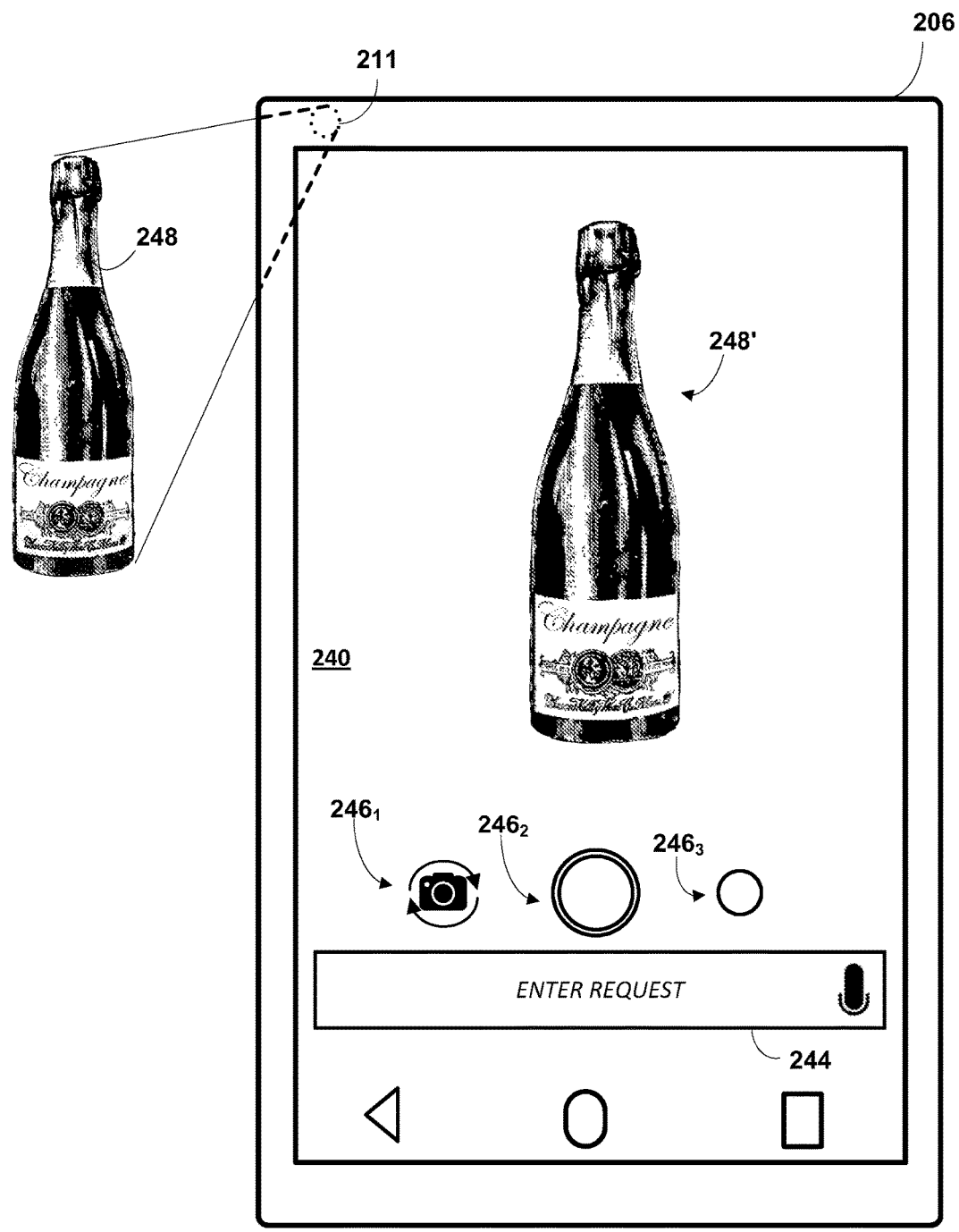
FIGS. 2, 3, 4, 5, and 6 depict examples of how techniques described herein may be employed, in accordance with various implementations.

FIG. 2 illustrates an example of how a user (not depicted) may interact with an instance of automated assistant (120 in FIG. 1, not depicted in FIG. 2) operating on a client device 206 to perform techniques described herein. Client device 206 takes the form of a smart phone or tablet computer that includes a touchscreen 240 and at least one camera 211 (front-facing and/or rear-facing). Rendered on touchscreen 240 is a graphical user interface associated with a camera application (e.g., 109 in FIG. 1), which includes an electronic viewfinder that renders, e.g., in real time, light data captured by camera 211. The graphical user interface includes a user input field 244 and one or more graphical elements 246$_{1-3}$ that may be operable to control operation of camera 211. For example, first graphical element 246$_1$ may be operable to switch between front- and rear-facing cameras, second graphical element 246$_2$ may be operable to capture an image (or video depending on the settings) using camera 211, and third graphical element 246$_3$ may be operable to view previously-captured photographs. Other graphical elements that are not depicted in FIG. 2 may be operable to perform other actions, such as changing camera settings, switching between image capture and video capture modes, adding various effects, etc.

User input field 244 may be operable by a user to provide various input, such as free-form natural language input that instructs an automated assistant 120 (not depicted in FIG. 2) executing on client device 206 to store metadata related to one or more captured images, in accordance with various implementations described herein. A user may provide, as input to user input field 244, text, speech (e.g., by clicking the microphone icon on the right), images, etc. In various implementations, speech input provided via user input field 244 may be converted to text, e.g., at client device 206 and/or remotely (e.g., at one or more cloud-based components).

As an example, camera 211 in FIG. 2 has captured a bottle of wine 248 in its field of view. Consequently, a rendition 248' of the bottle of wine 248 appears on touchscreen 240 as part of the aforementioned electronic viewfinder. Suppose the user is taking this picture because the user wants to document an opinion about bottle of wine 248. In various implementations, the user may invoke automated assistant 120, e.g., by tapping in user input field 244 or by speaking an invocation phrase such as "Hey Automated Assistant." Once automated assistant 120 is invoked, the user may speak or type natural language input that includes a task request to store an image (captured by camera 211) of bottle of wine 248, e.g., in association with user-selected metadata. Additionally or alternatively, the user may provide a single natural language input that both invokes automated assistant 120 and provides the task request. In some implementations, whenever a camera application 109 is active on a client device, automated assistant 120 may be invoked automatically, or may be invoked in response to different invocation phrases that otherwise would not invoke automated assistant 120. For example, in some implementations, when camera application 109 is active (i.e., being interacted with by user, presented as a graphical user interface, etc.), phrases such as "remember that . . . ," "keep in mind that . . . ," "remind me later that . . . ," and similar phrases may invoke automated assistant 120.

In various implementations, the steps of capturing the image and storing the user-selected metadata may be performed together or separately. For example, in some implementations, a user may take a picture (e.g., by pressing element 246$_2$ in FIG. 2), and then may invoke automated assistant 120 to store user-selected metadata, e.g., in association with the last-taken image. In other implementations, the user may point camera 211 at the desired target (e.g., capturing the desired target in the electronic viewfinder) and then invoke automated assistant 120 and/or provide the task request, which may both cause the image to be captured and store the metadata (and in some cases, the captured image.

Suppose that in FIG. 2, the user speaks the phrase, "Remember that I like this type of wine." Automated assistant 120 may recognize the task request from the spoken phrase and determine that the task request includes a request to store one or more images captured by camera 211 in association with metadata. Automated assistant 120 may then store, e.g., in images index 126 (which may be local to client device 206 and/or cloud-based) one or more images captured by camera 211. In addition, in some implementations, automated assistant 120 may store, e.g., in image metadata index 124 in association with the stored image, metadata. In this example, the metadata may include some or all of the content of the user's task request, such as "I like this type of wine."

In some implementations, capturing the image and/or providing the task request may also trigger additional tasks that may be performed, for instance, by automated assistant 120 and/or image processing engine 132. For example, in some implementations, subtasks may be triggered such as OCR, object recognition, barcode scanning, etc., that attempt to obtain additional metadata directly from the captured. In some implementations, one or more of these subtasks may be selected based on the user-provided task request (e.g., if the user names a product in her request, image processing image 132 may attempt to perform OCR and/or bar code scanning).

Later, the same user or a different user may provide, e.g., to automated assistant 120, a search query to which the stored metadata is responsive. For example, the user could speak the phrase "what bottles of wine to I like?" to the user's automated assistant 120. Because the stored metadata is responsive to this search query, the user's automated assistant 120 may provide a response that includes some or all of the stored metadata (e.g., in its raw form or reformulated as a sentence). Additionally or alternatively, the user's automated assistant 120 may surface the previously stored image, e.g., on touchscreen 240. Of course, if the user captures multiple images of multiple bottles of wine the user enjoys (and stores them in association with user-selected metadata using techniques described herein), then such a search query may return multiple results. In some such implementations, the multiple responsive images may be returned individually and/or as a collage.

Figure 3:
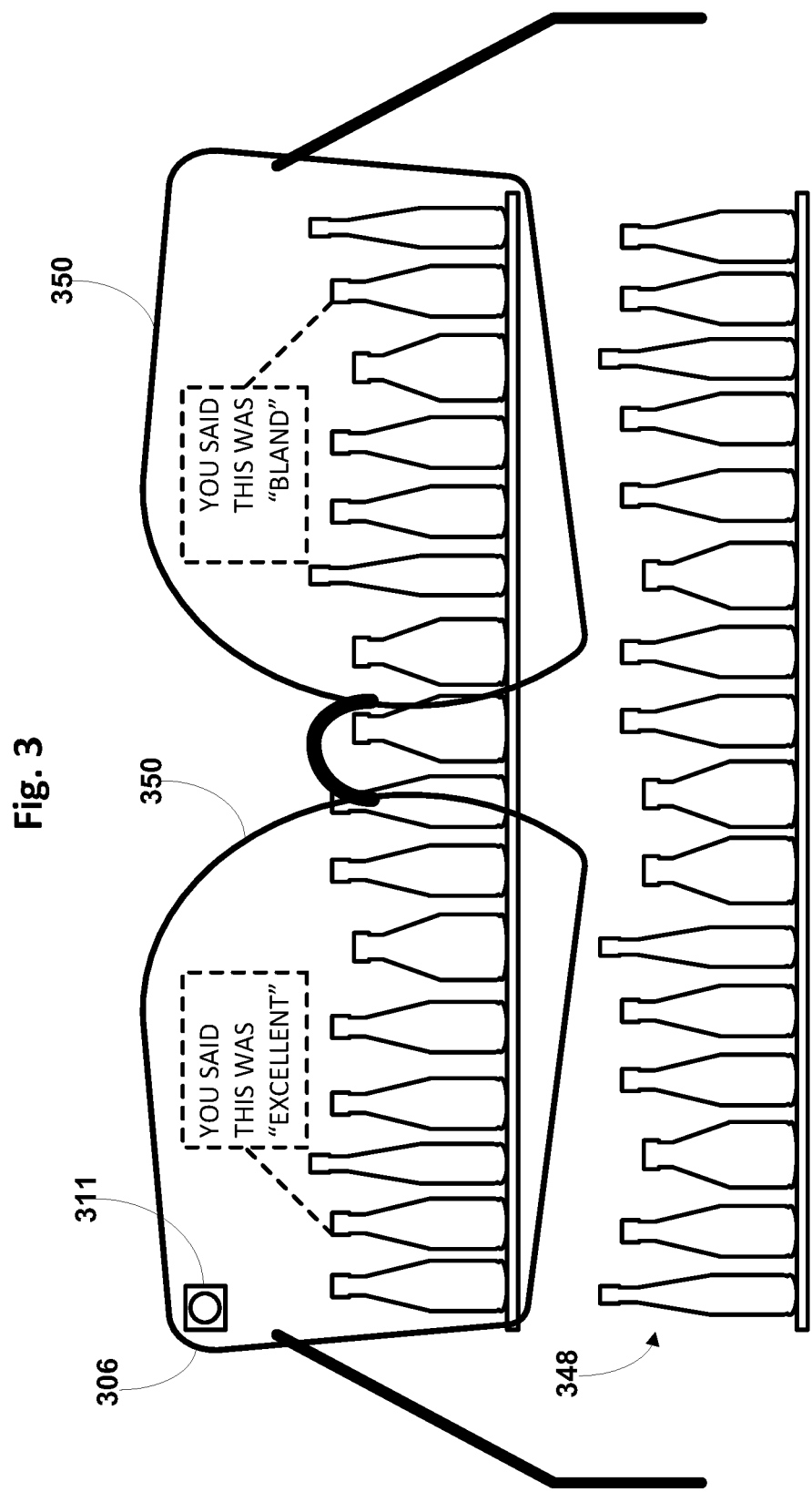

FIG. 3 depicts one possible application in which the stored image of bottle of wine 248 in FIG. 2 may be used to further aid a user. In FIG. 3, a client device 306 takes the form of so-called "smart" glasses that include transparent lenses 350 that are configured to act as display devices for the wearer. Client device 306 may also include one or more cameras 311 with field(s) of view that approximately correspond to what the wearer sees through lenses 350. In some implementations, images stored in association with user-selected metadata using techniques described herein may be used to provide information to a wearer of client device 306, e.g., using "augmented reality" display techniques.

For example, in FIG. 3, suppose client device 306 is part of the same coordinated ecosystem of client devices as client device 206 from FIG. 2. Suppose further that the wearer of client device 306 is visiting a store in which a plurality of wine bottles 348 are arranged on a shelf. The wearer can view the plurality of wine bottles 348 through lenses 350. Meanwhile, light data captured by camera(s) 311 may be analyzed, e.g., by image processing engine 132, to match one or more of the plurality of bottles of wine 348 to previously captured images (e.g., in images index 126). Then, user-selected metadata stored in association with the matching image(s) may be presented to the wearer of client device 305, e.g., as augmented reality annotations rendered on lenses 350. In FIG. 3, for example, one bottle of wine is annotated with the text, "You said this was 'excellent'" and another is annotated with the text, "you said this was 'bland.'"

As is demonstrated by this example, in various implementations of techniques described herein, user-selected metadata, when recalled (e.g., in response to a search query or some other event), may be surfaced (e.g., output visually or audibly) in various ways. In some instances, it may be surfaced to a user verbatim. In other implementations, the metadata may be reformulated and/or rephrased depending on various factors, such as the content of the metadata, the current context of the user, and so forth. For example, position coordinates related to an image of a parked car may be surfaced to a user using language such as "Your car is located at <location>." As another example, if a user issues a task request, "Remind me of <metadata>," when that metadata is later recalled, automated assistant 120 may preface it with language such as "You said <metadata>."

In various implementations, the ability to recognize objects and/or other entities as demonstrated in FIG. 3 may be always enabled and/or selectively enabled. For example, if client device 306 has a strong network connection such that it can efficiently exchange data with cloud-based components such as image processing engine 132, that may trigger camera 311 to capture data (e.g., in real time, continuously, at frame rates that are predetermined and/or selected based on network strength, etc.) so that the augmented reality annotations can be displayed to the user. On the other hand, if the network connection of client device 306 is weak or nonexistent, or if client device 306 has relatively little battery power, camera 311 may be disabled and/or light data captured by camera 311 may not be image processed as shown in FIG. 3. In some implementations users may also be able to manually activate camera 311 to implement techniques described herein, e.g., by speaking a phrase such as "Highlight bottles of wine I've commented on."

While the example of FIG. 3 pertains to helping a user identify particular products, this is not meant to be limiting. In various implementations, similar techniques may be employed to help a wearer identify other objects and/or entities. For example, in some implementations, a user may store an image of a particular type of nut to which the user is allergic, in association with metadata to that effect (e.g., "remember that I'm allergic to this type of nut."). When wearing client device 306, any other nut of that particular type may be matched to the previously-captured image and annotated, e.g., with language such as "you are allergic to this nut" (note the reformulation from the task request of "remember that I'm allergic to this type of nut"). Similar techniques could be used by users to, for instance, remember names of other individuals, or other information about other individuals (e.g., "Sally's birthday is June 4," "Bill likes the Knicks," "This person's name is Al, and his wife's name is Jane," etc.).

Figure 4:
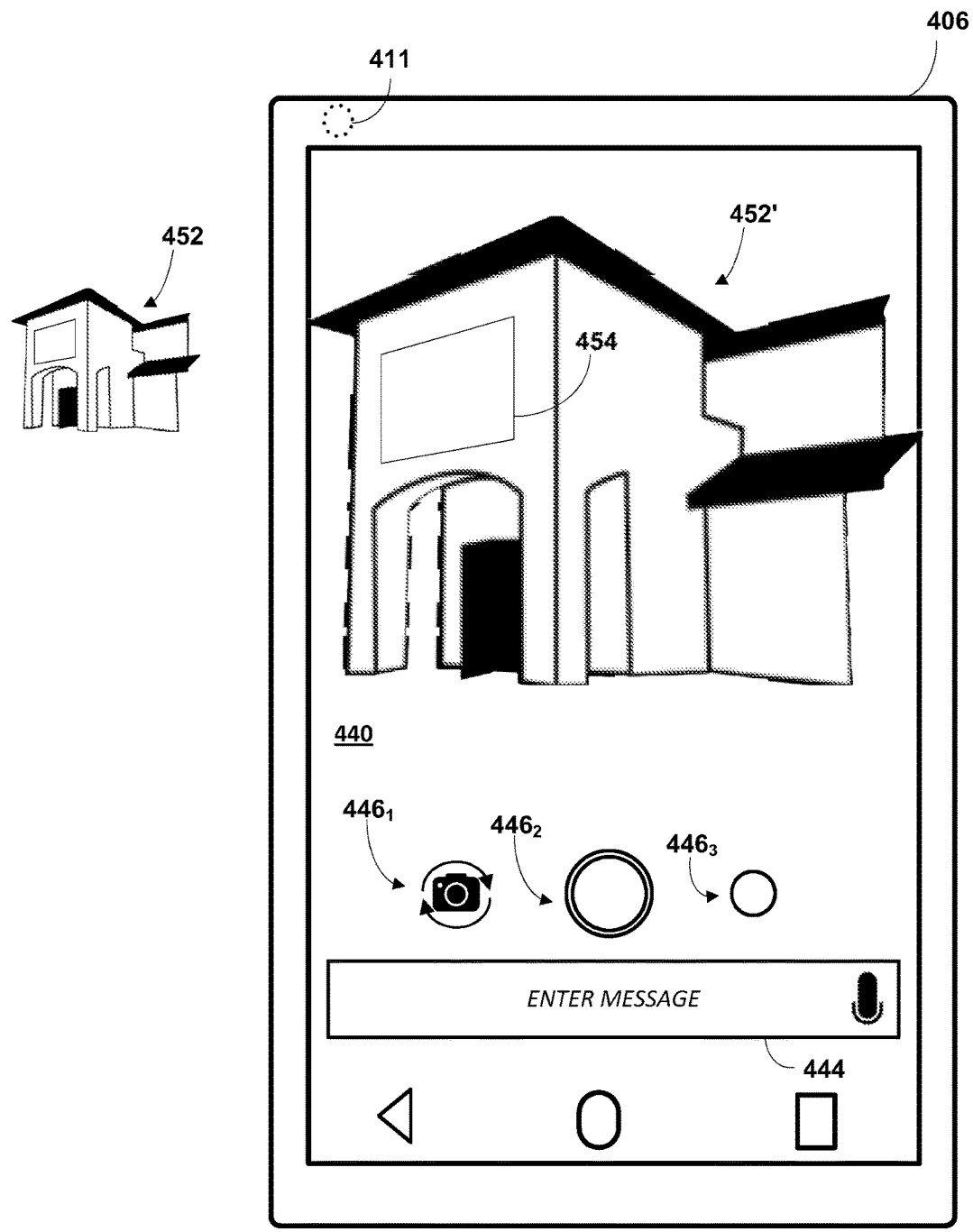

FIG. 4 depicts another example of using techniques described herein to store user-selected metadata, e.g., in association with a captured image, using a client device 406 configured with essentially the same components as client device 206 in FIG. 2 (and thus numbered similarly). In this example, suppose that a user is passing by a particular establishment 452 and captures the establishment 452 in a field of view of a camera 411. As a consequence, a rendition 452' of establishment 452 is rendered on touchscreen 440, e.g., in an electronic viewfinder forming part of a graphical user interface of a camera application (e.g., 109 in FIG. 1). Suppose further the user provides typed (e.g., via user input field 444) or spoken natural language input such as "Remind me to check this place out later," e.g., immediately before, after, or at the same time as the user presses second graphical element 446₂ to capture an image. The image that includes rendition 452' of establishment 452 may (or may not) be stored in association with metadata that is generated (e.g., verbatim, reformulated, extracted keywords, etc.) based on the user's natural language input. Later, suppose the user provides a search query such as "what place did I want to check out?" That search query may match the stored metadata. Accordingly, the metadata (and in some cases the previously stored image) may be surfaced to the user, e.g., by being rendered on touchscreen 440.

As noted above, in some implementations, the user-selected metadata may include information not explicitly input by the user. In the example of FIG. 4, for instance, the fact that the user's natural language input included the term "place" may trigger automated assistant 120 to obtain a position coordinate associated with the image of establishment 452. In some instances in which images are already stored in association with geotags as conventional metadata, the geotag may be copied from the image's conventional metadata and stored in image metadata index 124.

Additionally or alternatively, in some implementations, automated assistant 120, e.g., by way of image processing engine 132, may process the acquired image (or image data rendered in an electronic viewfinder) to recognize one or more objects and/or text depicted in the image. For example, establishment 452 may include a sign 454 that includes text (not depicted in FIG. 4) that conveys the name and/or address of the establishment. The depicted text may be OCR'd, e.g., by image processing engine 132, and the recognized text may be stored in whole or in part as user-selected metadata, e.g., in index 124. Thus, for instance, in FIG. 4, the name and/or address of establishment 452 may be stored, e.g., in association with the captured image, as user-selected metadata. Later, the user can search for this address to surface the previously-captured image of establishment 452. Additionally or alternatively, when the previously-captured image of establishment 452 is surfaced in response to a user's search query, the name and/or address of establishment 452 may also be surfaced. Similar techniques may be used, for instance, to recognize and store a Wi-Fi SSID and password from a surface of a Wi-Fi router, to recognize and store a passport number and/or expiration date from a passport, etc.

Figure 5:
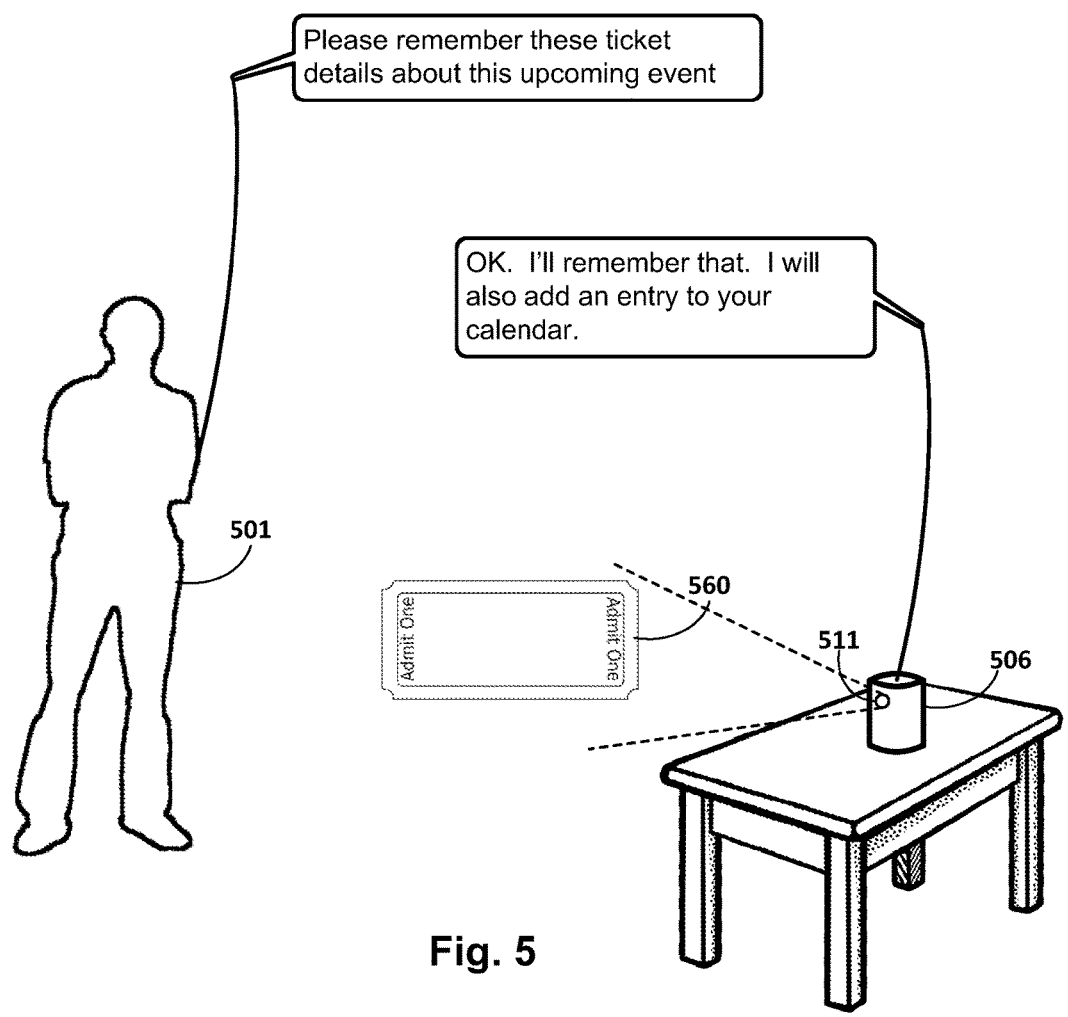

FIG. 5 depicts another example scenario in which disclosed techniques may be employed. In FIG. 5, client device 506 takes the form of a standalone interactive speaker that enables a user 501 to engage in a spoken human-to-computer dialog with automated assistant 120 executing at least in part on client device 506. To this end, client device 506 may also include one or more microphones (not depicted in FIG. 5) for detecting spoken input from user 501. Client device 506 also includes at least one camera 511 that is configured to capture images, e.g., in response to a task request from user 501. While not depicted in FIG. 5, in some implementations, client device 506 may also include a display device that, when used in tandem with camera 511, enables certain additional features such as those associated with the present disclosure.

In this example, user 501 has purchased a ticket 560 to an event. While not shown in FIG. 5, it can be assumed that printed on ticket 560 are various details of the event, such as a location, a date, a time, etc. Using techniques described herein, user 501 may be able to trigger automated assistant 120 to remember details of the event. For example, user 501 may provide the following spoken natural language input, "Please remember these ticket details about this upcoming event," e.g., while holding ticket 560 in a field of view of camera 511. At or around that moment, automated assistant 120 may cause camera 511 to capture an image of ticket 560. Image processing engine 132 may then perform optical character recognition or other similar techniques to extract text from the face of ticket 560. This text may be processed (e.g., parsed, etc.) to extract event details such as location, time, date, etc. These event details may then be stored as user-selected metadata, e.g., in association with the captured image.

User 501 or another user may later recall the captured image and/or user-selected metadata, e.g., by providing a search query directed to the event such as "Tell me about the upcoming event," or a search query indirectly related to the event, such as "what are my plans on Friday night?" (assuming the event is on Friday night, the automated assistant 120 may determine that the stored metadata is responsive to the search query).

Additionally or alternatively, in some implementations, automated assistant 120 may store the event details in a calendar entry of a calendar of user 501 (and may inform the user of this fact, as depicted in FIG. 5). More generally, in various implementations, user-selected metadata may be stored in suitable locations in addition to or instead of a general image metadata index 124, such as in users' calendars, reminder lists, contacts, etc. For example, if a user captures an image of someone else's identification (e.g., driver's license, passport, name badge, business card, etc.), the user can request that text extracted from identification be stored (remembered) as metadata in image metadata index 124 and/or in the user's contact list.

In some implementations, a task request may be provided via one or more output devices as a suggestion to a user, instead of the user proactively providing the task request. In various implementations, the task request may be selected based on one or more signals generated by one or more sensors of a client device. In some implementations, the one or more signals may include data captured by a camera of the client device. In some implementations, the one or more signals may include position coordinate data from a position coordinate sensor. Whatever signals are used, in various implementations, a suggested task request may be provided, e.g., by automated assistant 120, as a visual or audible prompt to the user.

One example of this is depicted in FIG. 6, which once again depicts a client device 606 in the form of a tablet or smart phone that includes many of the same components as were included in client devices 206 and 406 (and hence are numbered similarly). In this example, the user (not depicted) has operated client device 606 to capture, via a camera 611, an image of a vehicle 660. In various implementations, image processing engine 132 may process the image to identify the depicted object as being vehicle 660. In response, automated assistant 120 may proactively provide natural language output that includes a suggested task request for the user to trigger. For example, in FIG. 6, automated assistant 120 ("AA") provides the output, "This looks like a parked vehicle. Would you like me to remember a parking location associated with this image?" In some implementations, the user may simply respond (with speech or by typing in an undepicted input field) "yes" or "ok," and automated assistant 120 may employ techniques described herein to store, e.g., in association with the image of vehicle 660, metadata that includes, for instance, a position coordinate.

Figure 6:
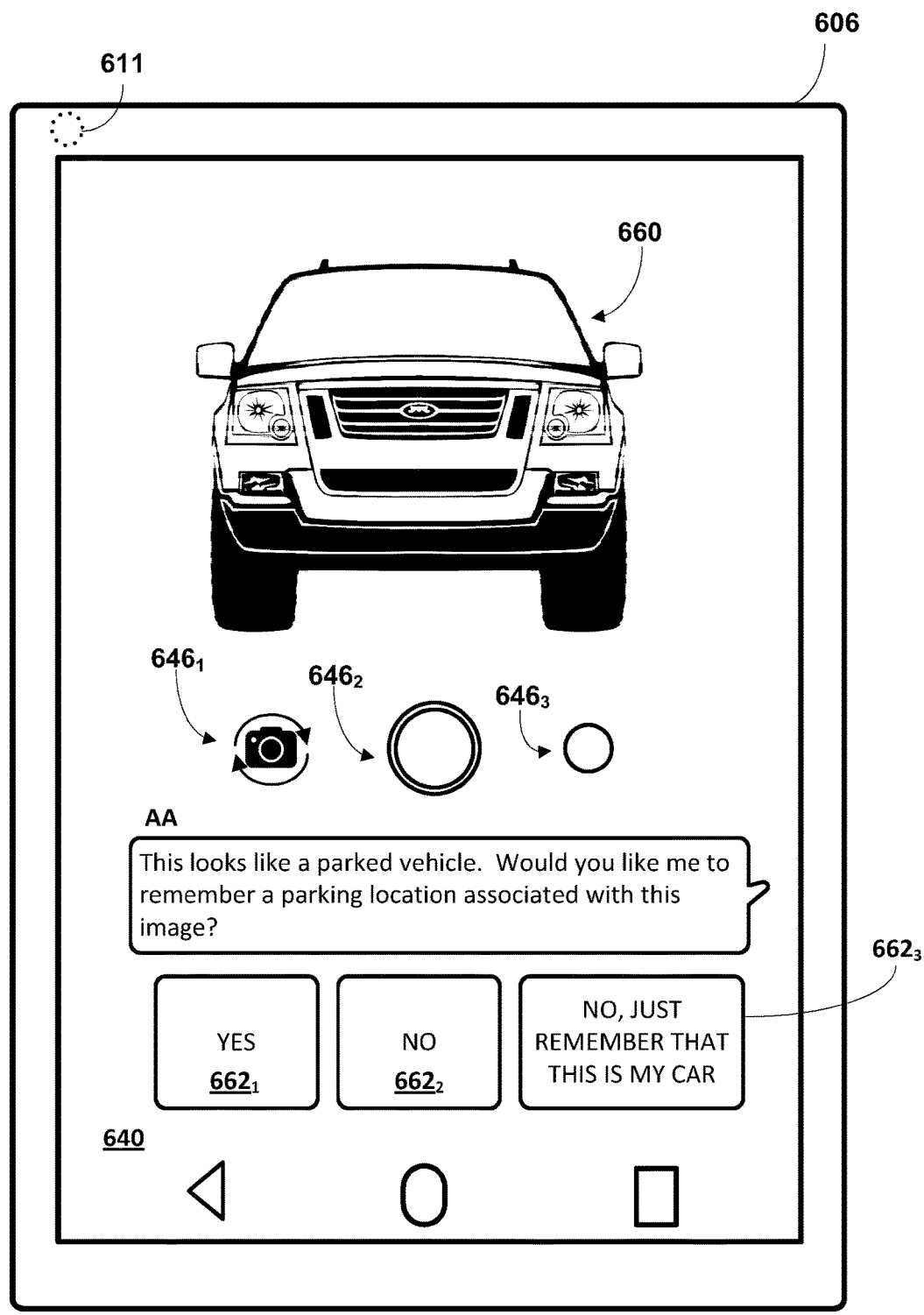

Additionally or alternatively, in some implementations (including the example of FIG. 6), one or more selectable elements 662 may be presented proactively, so that the user can select an element instead of providing free-form natural language input. In FIG. 6, for instance, a first selectable element $662_1$ answers in the affirmative, a second selectable element $662_2$ answers in the negative, and a third selectable element 662₃ declines but instructs automated assistant 120 to remember that the depicted vehicle is the user's car. Should the user select the last selectable element 662₃, in some implementations, content such as "my car" and any attributes of vehicle 660 that are discernable by image processing engine 132 may be stored as user-selected metadata, e.g., in association with the captured image. As noted above, in some implementations, image processing engine 132 may analyze and label any other images that also depict the user's car with the same or similar metadata.

In various implementations, image processing engine 132 may analyze a captured image and/or content of an electronic view finder (e.g., from a frame buffer) to attempt to detect text and/or recognizable objects, and this recognition may prompt automated assistant 120 to proactively provide selectable elements such as 662. For example, image processing engine 132 may detect a stall number or parking section near the parked vehicle. This may be particularly beneficial in underground garages and other structures in which position coordinates are difficult to obtain (e.g., weak GPS signal). In some such implementations, automated assistant 120 may obtain a position coordinate as soon as possible (e.g., once the user leaves the structure) and combine that with the recognized stall number as stored metadata. Later, automated assistant 120 and/or a separate maps application may use the position coordinate to guide the user back to the parking structure, and then provide a stall number for the user to find. Additionally or alternatively, automated assistant may combine the two types of data and synthesize an internal map even though position coordinates of the car are not available.

Figure 7:
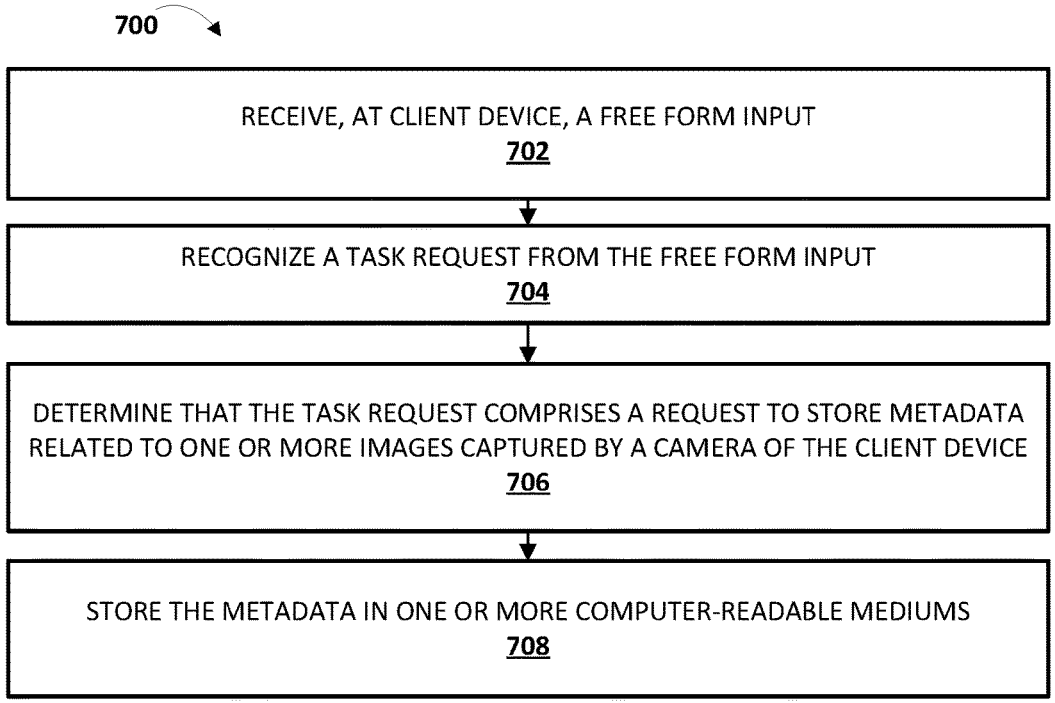
FIGS. 7 and 8 depict flowcharts illustrating example methods according to implementations disclosed herein.

FIG. 7 is a flowchart illustrating an example method 700 according to implementations disclosed herein. For convenience, the operations of the flow chart are described with reference to a system that performs the operations. This system may include various components of various computer systems, such as one or more components of automated assistant 120. Moreover, while operations of method 700 are shown in a particular order, this is not meant to be limiting. One or more operations may be reordered, omitted or added.

At block 702, the system may receive, at one or more input interfaces of a client device (e.g., 106, 206, 306, 406, 506, 606) of one or more client devices operated by a user, a natural language or "free form" input from a user. In various implementations, this natural language input may come in the form of spoken input and/or typed input. In some implementations, spoken input may be converted to text prior to being provided, for instance, to natural language processor 122. And as was described above with respect to FIG. 6, in other implementations, the input may take the form of a user selecting a graphical element that represents a suggest task request.

At block 704, the system may recognize a task request from the input, and at block 706, the system may determine that the task request comprises a request to store metadata related to one or more images captured by a camera of the client device. In some implementations, keywords or phrases such as "remember that . . . ," "keep in mind that . . . ," "remind me later that . . . ," and so forth may, alone or in combination with other cues (e.g., camera application 109 being active), trigger automated assistant 120 to recognize that the user has provided a task request to store a captured image in association with user-selected metadata. In various implementations, the metadata may be selected based on content of the task request, and/or may include other data that is captured, recognized, obtained, etc., in response to the task request (e.g., OCR'd text, position coordinates, object classification, etc.).

Figure 8:
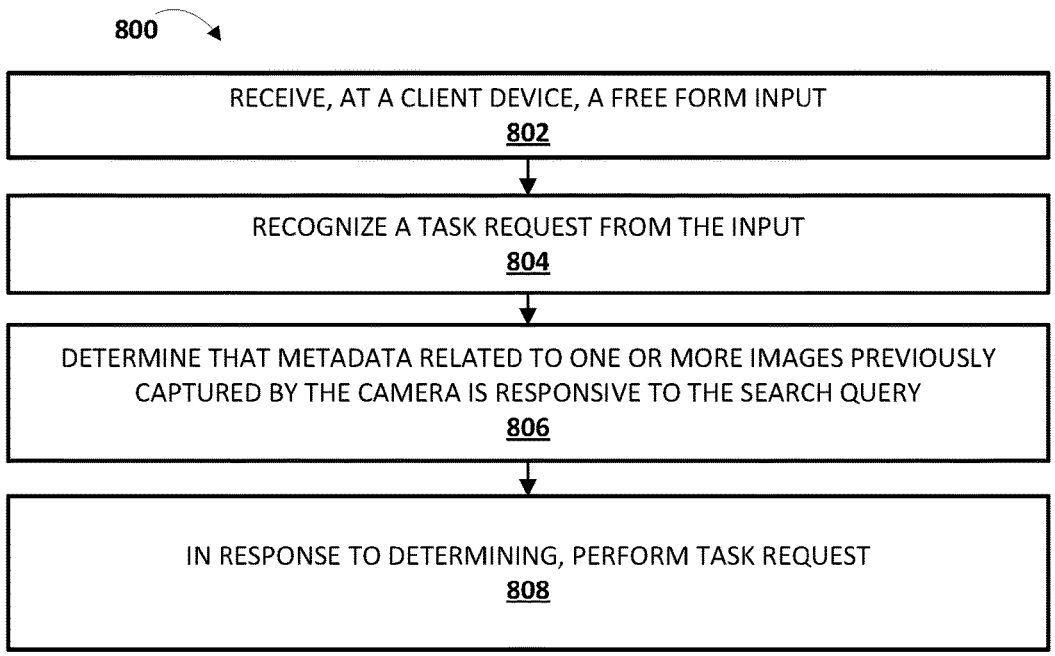

At block 708, the system may store the metadata in one or more computer-readable mediums. In various implementations, the one or more computer-readable mediums may be searchable using the metadata so that, for instance, a user can later retrieve previously captured images and/or corresponding user-selected metadata. An example flow for such searching is depicted in FIG. 8. In some implementations, the metadata may be stored in association with the one or more captured images, although this is not required (e.g., the images may be discarded once relevant metadata is captured, e.g., using object recognition and/or OCR).

FIG. 8 is another flowchart illustrating another example method 800 according to implementations disclosed herein. For convenience, the operations of the flow chart are described with reference to a system that performs the operations. This system may include various components of various computer systems, such as one or more components of automated assistant 120. Moreover, while operations of method 800 are shown in a particular order, this is not meant to be limiting. One or more operations may be reordered, omitted or added. In some implementations, the operations of method 800 may occur after the operations of method 700, although this is not required.

At block 802, the system may receive, at a client device, a free form input. As was the case at block 702 of FIG. 7, the input received at block 802 may be a spoken or typed natural language input that may be directed to automated assistant 120. At block 804, the system may recognize a task request from the free form input, and in some cases may provide the task request to image memory engine 130. In some implementations, this task request may take the form of a search query (e.g., find pictures of my son"), although this is not required.

At block 806, the system, e.g., via image memory engine 130, may determine that metadata (e.g., stored in image metadata index 124) related to one or more images previously captured by the camera is responsive to the search query. At block 808, the system may, in response to the determination at block 806, execute the task request, e.g., based on the metadata. For example, in some implementations, automated assistant 120 may provide, as output via one or more output devices of the same client device at which the task request was received or a different client device, one or both of content indicative of the metadata and the one or more images.

While client devices described in the examples have included smart phones, tablets, smart glasses, and stand-alone interactive speakers, this is not meant to be limiting. An automated assistant or other similar functionality may be installed on other types of electronics. For example, in some implementations, techniques described herein may be implemented on a digital camera. For example, the digital camera may have locally-stored photos and/or have network access to photos stored on the cloud," and may be able to, at the request of the user in response to user selection of various digital camera controls, store images in association with user-selected metadata and/or search for images using user-selected metadata. The same goes for other devices such as vehicle navigation systems, which may employ cameras in the front, sides, and or rear, such as backup cameras, dashboard cameras, etc.

Figure 9:
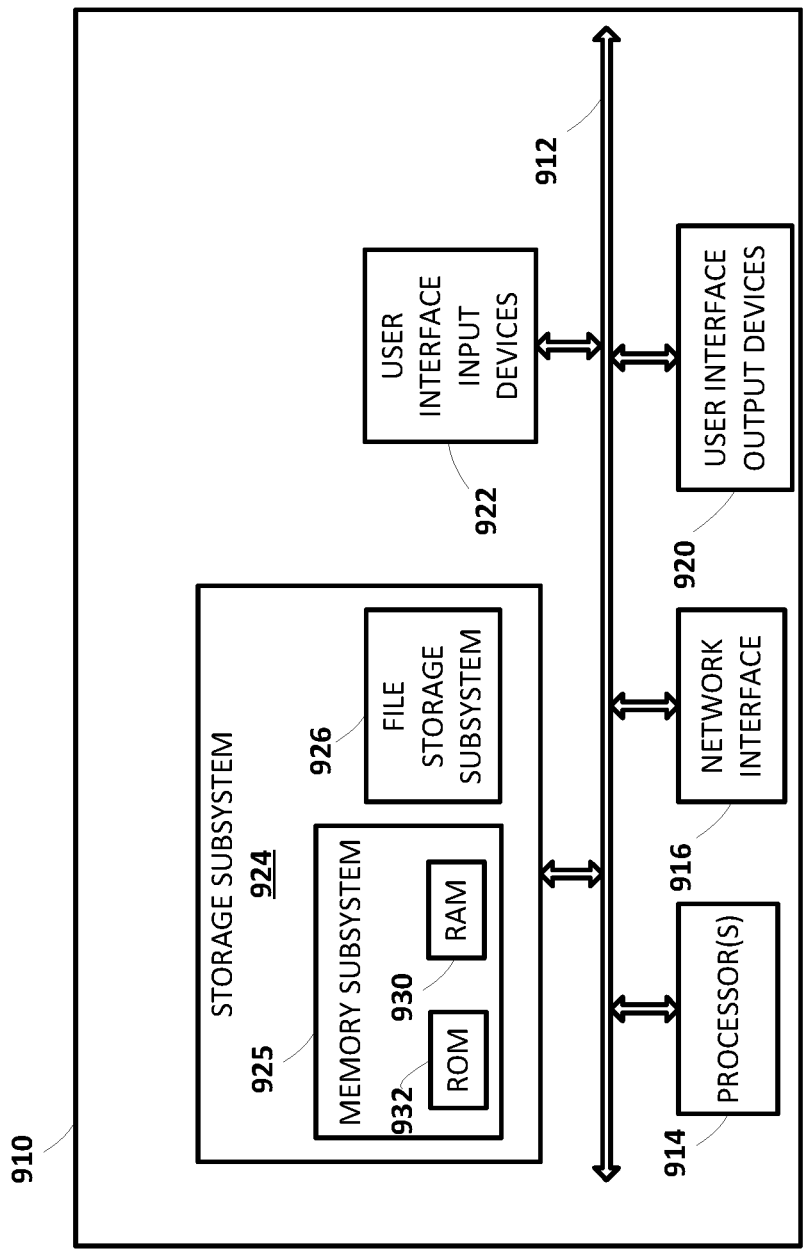
FIG. 9 illustrates an example architecture of a computing device.

FIG. 9 is a block diagram of an example computing device 910 that may optionally be utilized to perform one or more aspects of techniques described herein. In some implementations, one or more of a client device, automated assistant 120, and/or other component(s) may comprise one or more components of the example computing device 910.

Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image (e.g., augmented reality displays associated with "smart" glasses). The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of the methods of FIGS. 7 and 8, as well as to implement various components depicted in FIG. 1.

These software modules are generally executed by processor 914 alone or in combination with other processors. Memory 925 used in the storage subsystem 924 can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Furthermore, certain processing according to the present disclosure may take place exclusively on the user's device such that data and related processing are not shared to a network or other third party device or service, and may be encrypted and/or password protected for additional privacy and security.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method comprising:
streaming data captured by one or more cameras to an electronic viewfinder of a first client device of one or more client devices operated by a user;
invoking an automated assistant at least partially in response to the streaming;
receiving, at the first client device while the data captured by the camera is streamed to the electronic viewfinder, a free form input from the user directed at the automated assistant;
recognizing a task request from the free form input;
determining that the task request comprises a request for the automated assistant to store metadata related to one or more images captured by one or more of the cameras, wherein the metadata is selected based on content of the task request; and
storing the metadata in one or more computer-readable mediums, wherein the one or more computer-readable mediums are searchable by the automated assistant using the metadata.

2. The method of claim 1, wherein the free-form input is a first input, and the method further comprises:
receiving, at the first client device or a second client device of the one or more client devices, a second free form input;
recognizing another task request from the second free form input;
determining that the metadata related to the one or more images captured by the camera is responsive to the another task request; and
in response to determining that the metadata is responsive to the another task request, providing, as output via one or more output devices of the first or second client device, content indicative of the metadata.

3. The method of claim 1, further comprising providing, as output via one or more output devices of the first client device, the task request as a suggestion to the user, wherein the task request is selected based on one or more signals generated by one or more sensors of the first client device.

4. The method of claim 3, wherein the one or more signals include data captured by the camera.

5. The method of claim 3, wherein the one or more signals include position coordinate data from a position coordinate sensor.

6. The method of claim 1, further comprising:
performing image processing on the one or more images;
based on the image processing, identifying an object depicted in the one or more images; and
storing the metadata in association with another stored image that depicts the same object or another object sharing one or more attributes with the object.

7. The method of claim 1, further comprising performing optical character recognition on a portion of the one or more images to determine textual content depicted in the one or more images.

8. The method of claim 7, wherein the metadata further includes at least some of the textual content.

9. The method of claim 1, wherein the metadata includes at least some of the content of the task request.

10. The method of claim 1, wherein the metadata includes a position coordinate obtained simultaneously with capture of the one or more images.

11. At least one non-transitory computer-readable medium comprising instructions that, in response to execution of the instructions by one or more processors, cause the one or more processors to perform the following operations:
streaming data captured by one or more cameras to an electronic viewfinder of a first client device of one or more client devices operated by a user;
invoking an automated assistant at least partially in response to the streaming;
receiving, at the first client device while the data captured by the camera is streamed to the electronic viewfinder, a free form input from the user directed at the automated assistant;
recognizing a task request from the free form input;
determining that the task request comprises a request for the automated assistant to store metadata related to one or more images captured by one or more of the cameras, wherein the metadata is selected based on content of the task request; and
storing the metadata in one or more computer-readable mediums, wherein the one or more computer-readable mediums are searchable by the automated assistant using the metadata.

12. The method of claim 1, wherein invoking the automated assistant is further based on an invocation phrase that is activated to invoke the automated assistant during the streaming.

13. A system comprising one or more processors and memory storing instructions that, in response to execution of the instructions by the one or more processors, cause the one or more processors to:
stream data captured by one or more cameras to an electronic viewfinder of a first client device of one or more client devices operated by a user;
invoke an automated assistant at least partially in response to the streaming;
receive, at the first client device while the data captured by the camera is streamed to the electronic viewfinder, a free form input from the user directed at the automated assistant;
recognize a task request from the free form input;
determine that the task request comprises a request for the automated assistant to store metadata related to one or more images captured by one or more of the cameras, wherein the metadata is selected based on content of the task request; and
store the metadata in one or more computer-readable mediums, wherein the one or more computer-readable mediums are searchable by the automated assistant using the metadata.

14. The system of claim 13, wherein the free-form input is a first input, and the system further comprises instructions to:
receive, at the first client device or a second client device of the one or more client devices, a second free form input;
recognize another task request from the second free form input;
determine that the metadata related to the one or more images captured by the camera is responsive to the another task request; and
in response to the determination that the metadata is responsive to the another task request, provide, as output via one or more output devices of the first or second client device, content indicative of the metadata.

15. The system of claim 13, further comprising providing, as output via one or more output devices of the first client device, the task request as a suggestion to the user, wherein the task request is selected based on one or more signals generated by one or more sensors of the first client device.

16. The system of claim 15, wherein the one or more signals include data captured by the camera.

17. The system of claim 15, wherein the one or more signals include position coordinate data from a position coordinate sensor.

18. The system of claim 13, further comprising instructions to:
   perform image processing on the one or more images;
   based on the image processing, identify an object depicted in the one or more images; and
   store the metadata in association with another stored image that depicts the same object or another object sharing one or more attributes with the object.

19. The system of claim 13, further comprising instructions to perform optical character recognition on a portion of the one or more images to determine textual content depicted in the one or more images.

* * * * *